(12) United States Patent
Loner

(10) Patent No.: US 10,101,596 B1
(45) Date of Patent: Oct. 16, 2018

(54) EYE PATCH ATTACHABLE TO EYEGLASSES

(71) Applicant: Stephen M. Loner, Clearwater, FL (US)

(72) Inventor: Stephen M. Loner, Clearwater, FL (US)

( * ) Notice: Subject to any disclaimer, the term of this patent is extended or adjusted under 35 U.S.C. 154(b) by 0 days.

(21) Appl. No.: 15/246,860

(22) Filed: Aug. 25, 2016

Related U.S. Application Data

(63) Continuation-in-part of application No. 14/831,346, filed on Aug. 20, 2015.

(60) Provisional application No. 62/062,544, filed on Oct. 10, 2014.

(51) Int. Cl.
*G02C 7/16* (2006.01)
*A61F 9/00* (2006.01)

(52) U.S. Cl.
CPC ........... *G02C 7/16* (2013.01); *G02C 2202/10* (2013.01)

(58) Field of Classification Search
CPC ....... G02C 7/16; G02C 2202/10; A61F 9/045; A61F 9/04
USPC .......... 351/45, 44, 41; 128/858; 2/12–13, 15
See application file for complete search history.

(56) References Cited

U.S. PATENT DOCUMENTS

| | | | | |
|---|---|---|---|---|
| 5,927,279 A | * | 7/1999 | Oviatt | G02C 11/12 128/857 |
| 7,318,440 B1 | * | 1/2008 | Grijalva | A61F 9/04 128/858 |
| 8,418,695 B1 | * | 4/2013 | Moulton | A61F 9/04 128/858 |
| 2012/0069290 A1 | * | 3/2012 | Phillips | G02C 7/16 351/46 |
| 2013/0258272 A1 | * | 10/2013 | Bristol | G02C 7/16 351/158 |

OTHER PUBLICATIONS http://patchpals.com/inc/sdetail/neon_orange_cotton_eye_patch_child/27237/27249, 2000 Eye Patches by Patch Pals.*

* cited by examiner

*Primary Examiner* — Tuyen Tra
(74) *Attorney, Agent, or Firm* — Nicholas Pfeifer; Smith & Hopen, P.A.

(57) ABSTRACT

An eye patch formed of a flexible, opaque material is attached to a pair of eyeglasses. The patch has an asymmetric conical shape when in repose. The patch extends from an eyeglass nose bridge around a ninety degree (90°) bend to an eyeglass temple piece and overlies a lens of the eyeglasses. At least one slit is formed in an outboard end of the patch to slidingly receive the eyeglass temple piece. An elastic strap is secured to a peripheral boundary of the patch at the inboard end of the patch. The elastic strap underlies the nose bridge so that the elastic strap captures the nose bridge. The peripheral boundary of the patch abuts a user's face in encircling relation to an eye when the patch is secured to the eyeglasses so that light is prevented from reaching the eye.

20 Claims, 5 Drawing Sheets

EYE PATCH ATTACHABLE TO EYEGLASSES

CROSS-REFERENCE TO RELATED APPLICATIONS

This nonprovisional application is a continuation of and claims priority to nonprovisional application Ser. No. 14/831,346, entitled "EYE PATCH ATTACHABLE TO EYEGLASSES," filed Aug. 20, 2015 by the same inventor, which is a continuation of and claims priority to provisional application No. 62/062,544, entitled "EYE PATCH ATTACHABLE TO EYEGLASSES," filed Oct. 10, 2014 by the same inventor.

BACKGROUND OF THE INVENTION

1. Field of the Invention

This invention relates, generally, to the treatment of an eye condition commonly known as "lazy eye." More particularly, it relates to a flexible eye patch mountable on eyeglasses.

2. Description of the Prior Art

Placing a light-blocking eye patch over a non-lazy eye is an effective means for forcing the muscles of an uncovered, so-called lazy eye to become more active. Treatment times vary, but the eye patch treatment is effective for most individuals.

A well-known eye patch is a flat piece of opaque material a little larger than an eye socket that has an adhesive strip that circumscribes the outer periphery of the patch. The adhesive holds the patch in place, much like a band-aide. However, it has the same unwanted qualities of a band-aide, i.e., it loosens with time and requires repeated pressing throughout the day to prevent it from separating from the user's skin. It also loosens when the user perspires, showers, or otherwise gets wet. Many users find it uncomfortable as well, especially those with long eyelashes that rub against the inside surface of the patch.

To avoid the use of adhesives, inventors have developed patches that are attached to eyeglasses. Some of the known designs position the patch inside the lens, thereby failing to position the patch away from the eyelashes. Other known designs position the patch outside the lens, but they are difficult to attach to the eyeglasses.

What is needed, then, is an eyeglass-mounted, light-blocking eye patch that is positioned outside the lenses of a pair of eyeglasses and which is easy to attach.

Conventional eye patches are manufactured to fit either a left eye or a right eye. Thus, there is a need for an eye patch that can fit either eye. An eye patch that can be mounted to eyeglasses to cover a first eye and which can be reversed to cover a second eye would be beneficial.

However, in view of the art considered as a whole at the time the present invention was made, it was not obvious to those of ordinary skill in the art how the needed improved eye patch could be provided.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicant in no way disclaims these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

SUMMARY OF THE INVENTION

The long-standing but heretofore unfulfilled need for an improved eye patch is now met by a new, useful, and non-obvious invention.

The inventive eye patch is adapted to be releasably attached to a pair of eyeglasses and is formed of a flexible, opaque material having a length and height.

The novel eye patch is generally in the form of an asymmetric conical shape. The conical shape is defined by a peripheral boundary and an apex disposed therein, wherein the peripheral boundary is an asymmetric base for the asymmetric conical shape. The peripheral boundary is adapted to abut a user's face in encircling relation to a user's eye when the eye patch is secured to the eyeglasses so that light is substantially prevented from reaching the user's eye covered by the patch. Due to the asymmetric conical shape of the patch, no adhesive is required.

The eye patch includes a first surface and a second surface with a seam extending from the apex towards an inboard end of the peripheral boundary. The inboard end is the end nearest a user's nose when the eye patch is worn and is typically identified by incurvate arch that is larger than the incurvate arch on the outboard end.

A slit is disposed in the opaque material proximate the outboard end of the peripheral boundary. The slit creates an aperture between the first and second surfaces sized to receive a temple piece of the pair of eyeglasses. An embodiment includes a second slit also disposed near the outboard end sized to receive the temple piece. Two closely spaced apart, parallel slits are preferable to a single slit.

Proximate to the inboard end is a strap having a first end secured proximate to the peripheral boundary towards an upper end of the asymmetric conical shape and a second end secured proximate to the peripheral boundary towards a lower end of the asymmetric conical shape.

In an embodiment, the eye patch includes a first position of repose and a second position of repose. In the first position of repose, the first surface of the opaque material is an interior surface of the asymmetric conical shape and the second surface of the opaque material is disposed on an exterior surface of the asymmetric conical shape. In the second position of repose, the first surface of the opaque material is the exterior surface of the asymmetric conical shape and the second surface of the opaque material is disposed on the interior surface of the asymmetric conical shape. The eye patch may transition between the first and second positions of repose by displacing the apex from the exterior surface towards the interior surface. Effectively, the direction of the concavity of the eye patch is flipped when the apex is displaced. This embodiment further includes the strap being configured to move from one surface to the other surface ensuring that the strap is always on the interior concave surface of the eye patch.

In an embodiment, the length is substantially equal to a distance from an eyeglass nose bridge to a predetermined location on an eyeglass temple piece. The length extends between an inboard end and an outboard end. The inboard end is generally located nearest a nose bridge when the eye patch is properly secured to a pair of eyeglasses and the outboard end is the end of the eye patch that is furthest from the nose bridge on a pair of eyeglasses when the eye patch is properly secured to the pair of eyeglasses.

In an embodiment, the patch includes a substantially ninety degrees (90°) bend formed therein to wrap around a corner of the eyeglasses.

The patch is preferably manufactured by sewing and has a straight seam that extends from the apex of the asymmetrical cone to a peripheral edge of the patch. This provides an aesthetic eye patch because the seam looks natural and well-placed. When the apex of the patch is displaced so that the exterior surface of the patch becomes the interior surface, the patch can be used on a second, opposite eye. The seam then slants in a mirror image and the same aesthetic effect is maintained.

The patch can also be used on a second eye without displacing the exterior surface of the patch so that it becomes the interior surface, but then the seam does not mirror the seam of the patch when placed over the first eye and the aesthetic effect of the seam is reduced.

An important object of the invention is to provide a patch that overlies a pair of eyeglasses so that the patch does not interfere with the eyelashes of a wearer.

Another object is to provide a patch that lightly contacts a user's face around an eye in the absence of an adhesive yet which blocks light from entering the covered eye.

Another object is to provide an eye patch with an elastic strap secured to the peripheral edge of the patch at the inboard/nose end of the patch to facilitate attachment of the inboard/nose end of the patch to the nose bridge of a pair of eyeglasses.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the nature and objects of the invention, reference should be made to the following detailed disclosure, taken in connection with the accompanying drawings, in which.

DETAILED DESCRIPTION OF THE PREFERRED EMBODIMENT

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

Figure 1:
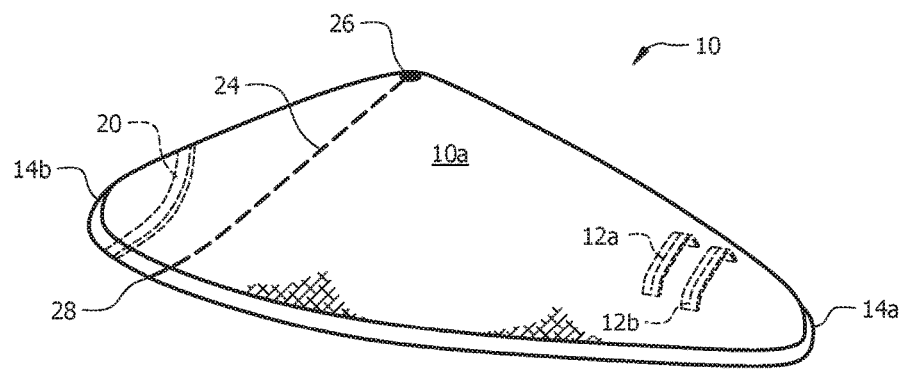
FIG. 1 is a perspective view of a novel eye patch oriented to cover a left eye.

FIG. 1 depicts an illustrative embodiment of the novel eye patch which is denoted as a whole by the reference numeral 10. Patch 10 is formed of a flexible, opaque material and has an asymmetric conical shape when in repose as depicted in FIG. 1. The asymmetric conical shape creates a concavity in which a portion of a pair of eyeglasses may be received. The exterior surface of patch 10 is denoted 10a in FIGS. 1, 2A, and 3. Interior surface 10b is depicted in the rear elevation view of FIG. 2B. Said FIG. 2B is produced by flipping FIG. 2A one hundred eighty degrees (180°) about a vertical axis—an axis that is generally aligned with the plane of the paper and extends parallel with the length of the paper.

Figure 3:
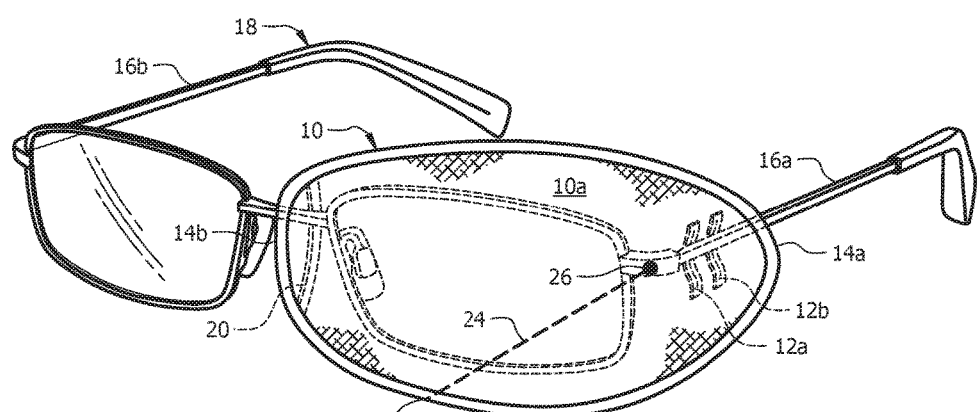
FIG. 3 is a perspective view depicting the patch of FIGS. 1, 2A and 2B when attached in covering relation to the left lens of a pair of eyeglasses and ultimately the left eye of a user when worn.

Slits 12a and 12b are formed in an outboard end 14a of patch 10. The slits 12a, 12b are adapted to slidingly receive a temple piece 16a, 16b of eyeglasses 18. As shown in FIG. 3, slits 12a, 12b receive the left temple piece 16a when patch 10 is secured to eyeglasses 18 in covering relation to the left lens of eyeglasses 18. In the embodiment shown in FIGS. 6 and 7, slits 12a, 12b are simply opening in patch 10 through which a temple piece 16a, 16b may pass. The temple pieces pass from either exterior surface 10a to interior surface 10b or vice versa.

As depicted in the embodiment provided in FIG. 1-5, each slit 12a, 12b is secured to interior surface 10b at an upper end and a lower end to create an unattached receiving space therebetween. In an embodiment, each slit 12a, 12b may comprise of a first strap attachable to a second strap. The two strap system provides some adjustability in the size of the receiving space. As a result, any sized temple piece 16a, 16b can be tightly strapped into the receiving space.

Figure 5:
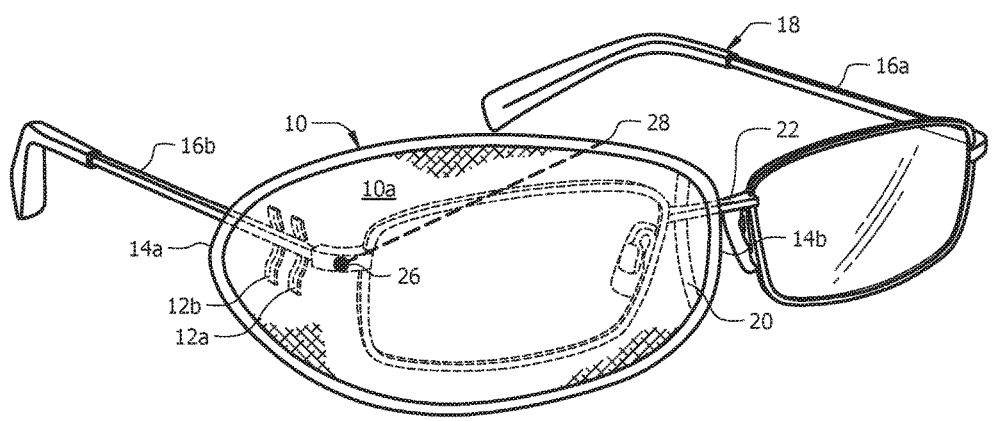
FIG. 5 is a perspective view of the novel patch when attached in covering relation to the right lens of a pair of eyeglasses and ultimately the right eye of a user when worn.

Patch 10 also includes elastic strap 20 located near inboard/nose end 14b of patch 10. Elastic strap 20 is secured to patch 10 at an upper end and a lower end of patch 10, creating a receiving area through which nose bridge 22 is intended to rest. FIGS. 3, 5, and 7 depict, in dotted lines, nose bridge 22 disposed between elastic strap 20 and patch interior surface 10b when patch 10 is secured to eyeglasses 18. Similar to slits 12a, 12b, an embodiment of strap 20 may comprise a first strap attachable to a second strap. The two strap system provides some adjustability in the size of the receiving space between strap 20 and interior surface 10b. As a result, any sized nose bridge 22 can be tightly strapped into the receiving space to help secure patch 10 to a desired location along eyeglasses 18. In an embodiment, particularly the one shown in FIGS. 6-7, strap 20 is attached to the peripheral edges of patch 10, such that strap 20 has two positions of repose. One position of repose includes strap 20 located on surface 10b and a second position of repose includes strap 20 located on surface 10a.

Figure 2A:
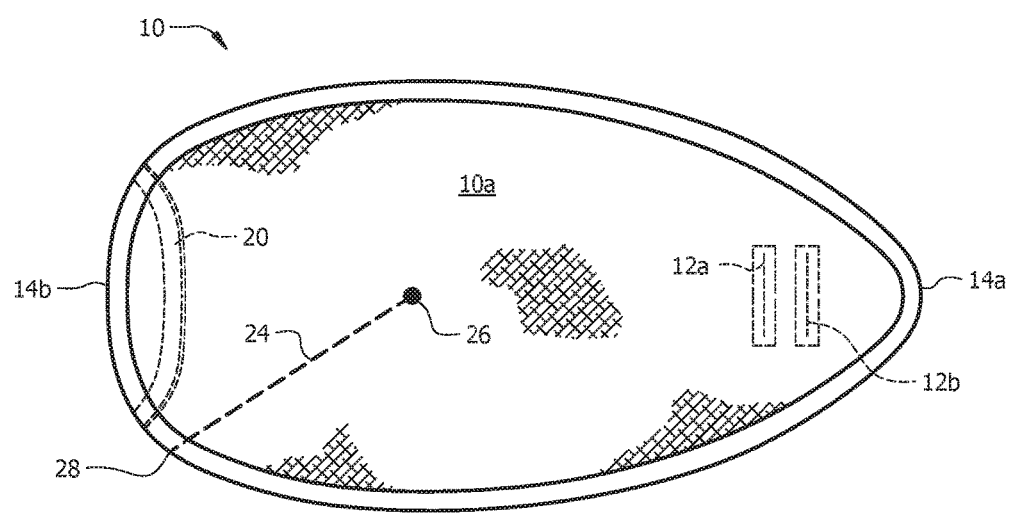
FIG. 2A is a front elevation view of the embodiment shown in FIG. 1.
Figure 2B:
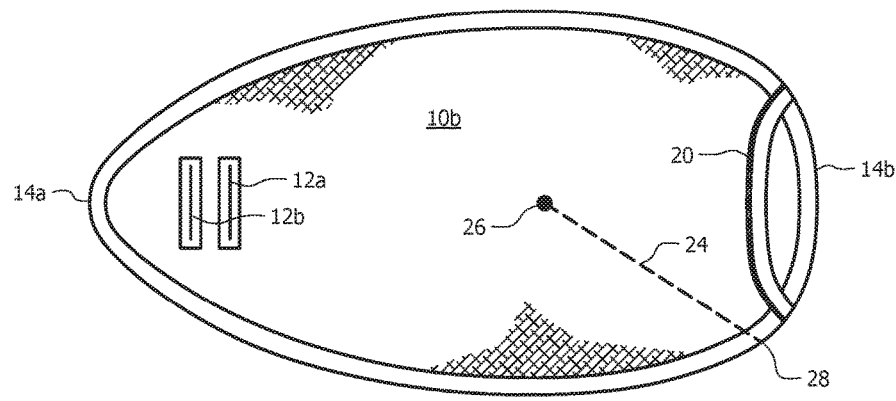
FIG. 2B is a rear elevation view of the embodiment shown in FIG. 1.

In FIG. 3, apex 26 extends out of the plane of the paper, just as in FIGS. 1 and 2A, i.e., toward the viewer and away from the eyes of the user. Apex 26 extends into the plane of the paper in the rear elevation view of FIG. 2B, away from the eyes of the user. Apex 26 provides the necessary concavity to ensure that patch 10 can properly curve around the lens and temple piece 16a, 16b of eyeglasses 18.

The preferred sewing procedure for making patch 10 creates straight seam 24, which extends from apex 26 of the asymmetrical cone and which extends to a predetermined point 28 on the peripheral edge of patch 10. Seam 24 is angled downwardly and towards inboard end 14b of patch 10 in the perspective view of FIG. 1, in the front elevation view of FIG. 2A, and in the perspective view of FIG. 3. Seam 24 further aids in the curvature of patch 10 around the lens and temple piece 16a, 16b of eyeglasses 18.

Figure 4:
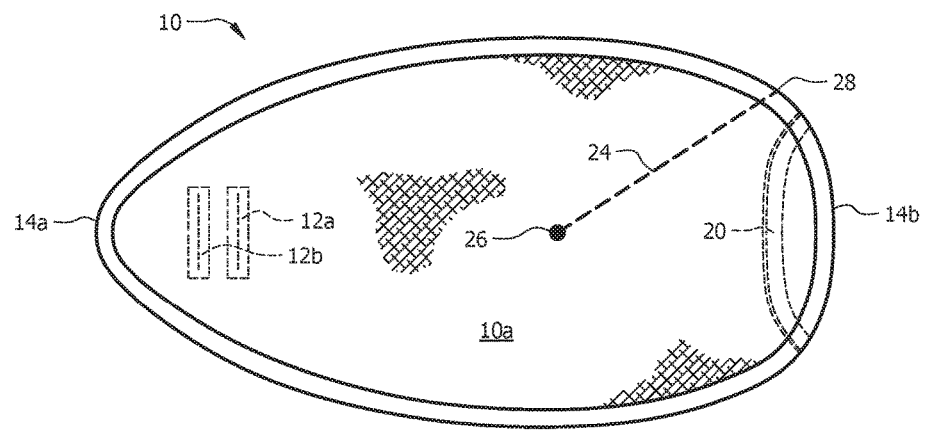
FIG. 4 is a front elevation view of the embodiment shown in FIG. 2A rotated one hundred eighty degrees (180°) from its FIG. 2A position.

FIG. 4 depicts the structure of FIG. 2A when rotated in the plane of the paper one hundred eighty degrees (180°). End 14a remains the outboard end of patch 10 and end 14b remains the inboard end thereof, relative to the user. The orientation shown in FIG. 4 is intended for attaching eye patch 10 to eyeglasses 18 in covering relation to the right lens, as shown in FIG. 5. Apex 26 in FIG. 4 is therefore still extending out of the plane of the paper towards the viewer, which direction is away from the user of the eye patch as evidenced from FIG. 5.

If a patch is manufactured to cover a left eye as depicted in FIGS. 1-3, a user may rotate that patch into its FIG. 4 position, followed by placing right eyeglass temple piece 16b through slits 12a, 12b and placing nose bridge 22 between elastic strap 20 and interior surface 10b, as depicted in the perspective view of FIG. 5.

Patch 10 when in its FIG. 5 configuration performs its light-blocking function over the user's right eye. The only drawback will be that, as depicted in FIG. 5, seam 24 slants upwardly toward the user's nose instead of downwardly as in FIG. 3. That aesthetic effect is visible only to others, not to the wearer of the patch because the inside of the patch is dark to the user and seam 24 is invisible to the user regardless of which way it slants.

In an embodiment, as shown in FIGS. 6-7, apex 26 may be displaced to alter the direction of concavity and strap 20 includes a first and a second position of repose. Strap 20 is located on surface 10a in its first position of repose and located on surface 10b in its second position of repose. Reorientation of apex 26 allows a user to alter the direction of concavity towards surface 10a or towards surface 10b while maintaining the direction of seam 24.

Figure 6A:
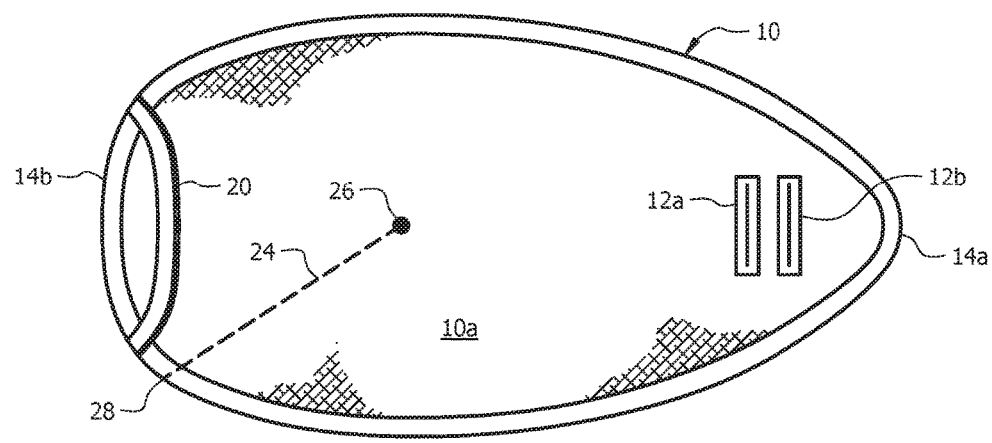
FIG. 6A a rear elevation view of an embodiment when the apex is displaced by a user so that said apex extends into the plane of the paper.
Figure 7:
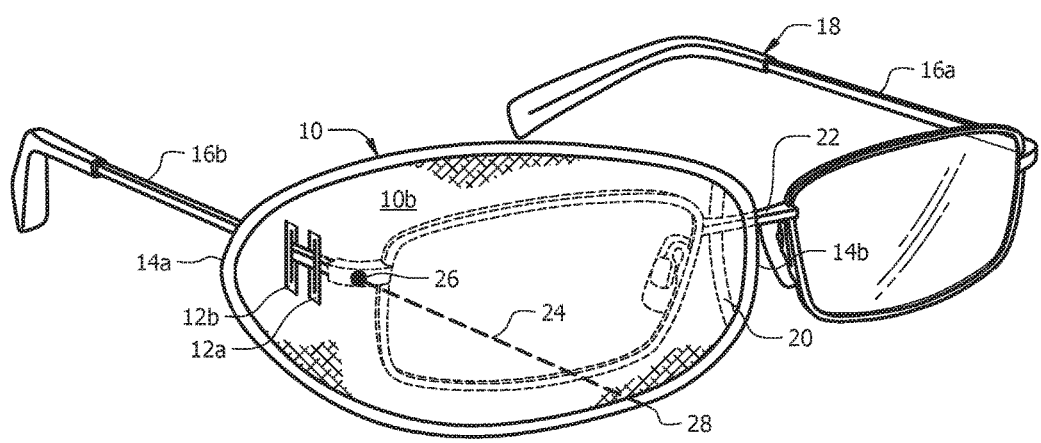
FIG. 7 depicts the patch in the FIG. 6B orientation so that the patch is positioned over the right lens of a pair of eyeglasses and ultimately the right eye of a user when worn.

As shown in FIG. 6A, apex 26 is displaced by a user so that said apex extends into the plane of the paper and seam 24 extends downwards towards inboard/nose end 14b. Reorientation of apex 26 creates a concavity towards surface 10a. Indeed, surface 10a becomes the interior surface while surface 10b becomes the exterior surface. Further, strap 20 is located on surface 10a in its first position of repose. Slant 24 remains angled downwards and towards the inboard end 14b when oriented to cover the right lens of eyeglasses 18.

Figure 6B:
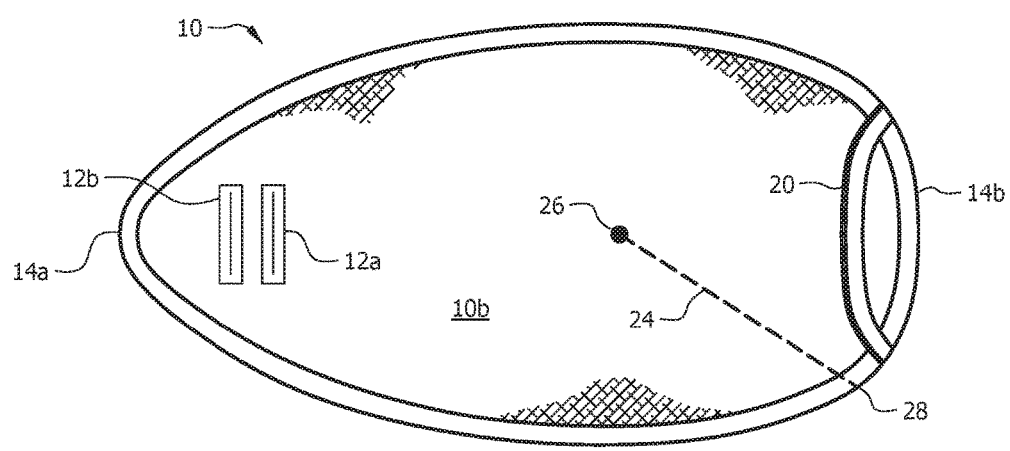
FIG. 6B depicts the opposite side of FIG. 6A, so that the exterior surface extends out of the plane of the paper towards the viewer.

FIG. 6B provides a view of surface 10b, the opposite side depicted in FIG. 6A, with the structure of FIG. 6A being rotated one hundred eighty degrees (180°) about a vertical axis extending the length of the paper. FIG. 6B illustrates how apex 26 can displaced by a user so that said apex extends into the plane of the paper causing surface 10b to become the interior surface. Surface 10a resultantly becomes the exterior surface. Further, strap 20 is located in its second position of repose.

FIGS. 6A and 6B, illustrate how displacement of apex 26 allows a user to alter the direction of concavity towards surface 10a or towards surface 10b while maintain the direction of seam 24 downwards towards inboard end 14b.

Referring now to FIG. 7, the eye patch as oriented in FIG. 6A is secured to eyeglasses 18. Right temple piece 16b is slidingly inserted through slits 12a, 12b and elastic strap 20, in its first position of repose, is positioned under nose bridge 22. Apex 26 extends away from the covered lens, i.e., away from the user of patch 10. Seam 24 slants downwardly and inwardly relative to a viewer and such slant is a mirror image of the slant depicted in FIGS. 2A and 3. A comparison of FIGS. 4 and 6B mostly clearly illustrates the difference between the upwardly slanting seam 24 in FIG. 4 and the downwardly sloping seam 24 in FIG. 6B.

Users who prefer the upward and inward seam slant of FIG. 5 thus leave apex 26 in its FIGS. 1 and 2A orientation when switching a patch from a left eye to a right eye and those wearers who prefer the appearance of FIG. 7 will push the apex of FIGS. 1 and 2A into the plane of the paper to achieve the look of FIG. 7 when switching a patch from a left eye to a right eye.

The flexibility of the eye patch enables a manufacturer to produce one embodiment of the patch. The user can use the patch on either eye and maintain the downward and inward slant of seam 24 by changing apex 26 from one side of the patch to the other, i.e., by switching the convexity of FIG. 1 to a concavity.

Glossary of Claim Terms Alphabetize

Eyeglasses: is an apparatus intended to rest upon a user's nose and/or ears in covering relation to the user's eyes.

Inboard End: is an end of the eye patch that is nearest a nose bridge when the eye patch is properly secured to a pair of eyeglasses.

Opaque Material: is a material that limits transparency.

Outboard End: is an end of the eye patch that is furthest from the nose bridge on a pair of eyeglasses when the eye patch is properly secured to the pair of eyeglasses.

It will thus be seen that the objects set forth above, and those made apparent from the foregoing disclosure, are efficiently attained and since certain changes may be made in the above construction without departing from the scope of the invention, it is intended that all matters contained in the foregoing disclosure or shown in the accompanying drawings shall be interpreted as illustrative and not in a limiting sense.

It is also to be understood that the following claims are intended to cover all of the generic and specific features of the invention herein disclosed, and all statements of the scope of the invention that, as a matter of language, might be said to fall therebetween.

What is claimed is:

1. An eye patch adapted to releasably attach to a pair of eyeglasses, comprising:
   an opaque material having an asymmetric conical shape defined by a peripheral boundary and an apex, wherein the peripheral boundary is an asymmetric base for the asymmetric conical shape;
   the opaque material including a first surface and a second surface;
   a seam in the opaque material extending from the apex towards an inboard end of the peripheral boundary;
   a slit disposed in the opaque material proximate an outboard end of the peripheral boundary, the slit creating an aperture between the first and second surfaces sized to receive a temple piece of the pair of eyeglasses; and
   a strap having a first end secured proximate to the peripheral boundary towards an upper end of the asymmetric conical shape and a second end secured proximate to the peripheral boundary towards a lower end of the asymmetric conical shape, both the first and second ends of the strap located proximate to an inboard end of the asymmetric conical shape.

2. The eye patch of claim 1, further comprising:
   a first position of repose, wherein the first surface of the opaque material is an interior surface of the asymmetric conical shape and the second surface of the opaque material is disposed on an exterior surface of the asymmetric conical shape;
   a second position of repose, wherein the first surface of the opaque material is the exterior surface of the asymmetric conical shape and the second surface of the opaque material is disposed on the interior surface of the asymmetric conical shape; and
   the apex being displaceable such that the eye patch can transition between the first and second positions of repose by displacing the apex from the exterior surface towards the interior surface.

3. The eye patch of claim 2, wherein the strap is pulled around the inboard end of the eye patch towards the interior surface of the opaque material and into a second position of repose.

4. The eye patch of claim 1, further comprising a length extending between an inboard end and an outboard end, and the length being substantially equal to a distance from a nose bridge on the eyeglasses to a predetermined location on the temple piece of the eyeglasses.

5. The eye patch of claim 1, further comprising the patch having a substantially ninety degrees (90°) bend formed therein to wrap around a corner of the eyeglasses.

6. The eye patch of claim 1, further comprising a second slit disposed in the opaque material proximate an outboard end of the peripheral boundary, wherein the second slit creates a second aperture between the first and second surfaces.

7. The eye patch of claim 1, wherein the strap is made of a flexible elastic material.

8. The eye patch of claim 1, wherein the peripheral boundary of the patch is adapted to abut a user's face in encircling relation to an eye when the eye patch is secured to the eyeglasses so that light is substantially prevented from reaching the user's eye covered by the patch.

9. An eye patch adapted to releasably attach to a pair of eyeglasses, comprising:
   an opaque material having an asymmetric conical shape defined by a peripheral boundary and an apex, wherein the peripheral boundary is an asymmetric base for the asymmetric conical shape;
   the opaque material including a first surface and a second surface;
   a seam in the opaque material extending from the apex towards an inboard end of the peripheral boundary;
   a slit disposed in the opaque material proximate an outboard end of the peripheral boundary, the slit creating an aperture between the first and second surfaces sized to receive a temple piece of the pair of eyeglasses;
   a strap having a first end secured proximate to the peripheral boundary towards an upper end of the asymmetric conical shape and a second end secured proximate to the peripheral boundary towards a lower end of the asymmetric conical shape, both the first and second ends of the strap located proximate to an inboard end of the asymmetric conical shape;
   a first position of repose, wherein the first surface of the opaque material is an interior surface of the asymmetric conical shape and the second surface of the opaque material is disposed on an exterior surface of the asymmetric conical shape;
   a second position of repose, wherein the first surface of the opaque material is the exterior surface of the asymmetric conical shape and the second surface of the opaque material is disposed on the interior surface of the asymmetric conical shape; and
   the apex being displaceable such that the eye patch can transition between the first and second positions of repose by displacing the apex from the exterior surface towards the interior surface.

10. The eye patch of claim 9, wherein the strap is pulled around the inboard end of the eye patch towards the interior surface of the opaque material and into a second position of repose.

11. The eye patch of claim 9, further comprising a length extending between an inboard end and an outboard end, and the length being substantially equal to a distance from a nose bridge on the eyeglasses to a predetermined location on the temple piece of the eyeglasses.

12. The eye patch of claim 9, further comprising the patch having a substantially ninety degrees (90°) bend formed therein to wrap around a corner of the eyeglasses.

13. The eye patch of claim 9, further comprising a second slit disposed in the opaque material proximate an outboard end of the peripheral boundary, wherein the second slit creates a second aperture between the first and second surfaces.

14. The eye patch of claim 9, wherein the strap is made of a flexible elastic material.

15. The eye patch of claim 9, wherein the peripheral boundary of the patch is adapted to abut a user's face in encircling relation to an eye when the eye patch is secured to the eyeglasses so that light is substantially prevented from reaching the user's eye covered by the patch.

16. An eye patch adapted to releasably attach to a pair of eyeglasses, comprising:
   an opaque material having an asymmetric conical shape defined by a peripheral boundary and an apex, wherein the peripheral boundary is an asymmetric base for the asymmetric conical shape and is adapted to abut a user's face in encircling relation to a user's eye when the eye patch is secured to the eyeglasses so that light is substantially prevented from reaching the user's eye covered by the patch;

the opaque material including a first surface and a second surface;

a seam in the opaque material extending from the apex towards an inboard end of the peripheral boundary;

a slit disposed in the opaque material proximate an outboard end of the peripheral boundary, the slit creating an aperture between the first and second surfaces sized to receive a temple piece of the pair of eyeglasses;

a strap having a first end secured proximate to the peripheral boundary towards an upper end of the asymmetric conical shape and a second end secured proximate to the peripheral boundary towards a lower end of the asymmetric conical shape, both the first and second ends of the strap located proximate to an inboard end of the asymmetric conical shape;

a first position of repose, wherein the first surface of the opaque material is an interior surface of the asymmetric conical shape and the second surface of the opaque material is disposed on an exterior surface of the asymmetric conical shape;

a second position of repose, wherein the first surface of the opaque material is the exterior surface of the asymmetric conical shape and the second surface of the opaque material is disposed on the interior surface of the asymmetric conical shape; and the apex being displaceable such that the eye patch can transition between the first and second positions of repose by displacing the apex from the exterior surface towards the interior surface.

17. The eye patch of claim 16, wherein the strap is adapted to be pulled around the inboard end of the eye patch towards the interior surface of the opaque material and into a second position of repose.

18. The eye patch of claim 16, further comprising a length extending between an inboard end and an outboard end, and the length being substantially equal to a distance from a nose bridge on the eyeglasses to a predetermined location on the temple piece of the eyeglasses.

19. The eye patch of claim 16, further comprising the patch having a substantially ninety degrees (90°) bend formed therein to wrap around a corner of the eyeglasses.

20. The eye patch of claim 16, further comprising a second slit disposed in the opaque material proximate an outboard end of the peripheral boundary, wherein the second slit creates a second aperture between the first and second surfaces.

* * * * *